(12) United States Patent
Chillar et al.

(10) Patent No.: US 7,716,930 B2
(45) Date of Patent: May 18, 2010

(54) INTEGRATED PLANT COOLING SYSTEM

(75) Inventors: Rahul J. Chillar, Greenville, SC (US); Raub W. Smith, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 766 days.

(21) Appl. No.: 11/699,290

(22) Filed: Jan. 29, 2007

(65) Prior Publication Data
US 2008/0178590 A1    Jul. 31, 2008

(51) Int. Cl.
*F02C 1/00* (2006.01)
*F02G 3/00* (2006.01)

(52) U.S. Cl. .................. 60/728; 60/785; 60/39.182

(58) Field of Classification Search .............. 60/782, 60/785, 728, 39.182, 39.5, 39.511
See application file for complete search history.

(56) References Cited

U.S. PATENT DOCUMENTS

| | | | | |
|---|---|---|---|---|
| 5,083,423 A * | 1/1992 | Prochaska et al. | ............. | 60/772 |
| 5,203,161 A * | 4/1993 | Lehto | ............. | 60/39.53 |
| 5,469,705 A * | 11/1995 | Glenn, Jr. | ............. | 60/693 |
| 5,632,148 A * | 5/1997 | Bronicki et al. | ............. | 60/728 |
| 6,107,693 A * | 8/2000 | Mongia et al. | ............. | 290/52 |
| 6,170,263 B1 * | 1/2001 | Chow et al. | ............. | 60/649 |
| 6,173,563 B1 * | 1/2001 | Vakil et al. | ............. | 60/772 |
| 6,313,544 B1 * | 11/2001 | Mongia et al. | ............. | 290/52 |
| 6,408,609 B1 * | 6/2002 | Andrepont | ............. | 60/772 |
| 6,470,686 B2 * | 10/2002 | Pierson | ............. | 60/772 |
| 6,484,506 B1 * | 11/2002 | Bellac et al. | ............. | 60/772 |
| 6,745,574 B1 * | 6/2004 | Dettmer | ............. | 60/784 |
| 6,848,267 B2 * | 2/2005 | Pierson | ............. | 62/299 |
| 6,909,349 B1 | 6/2005 | Longardner et al. | ............. | 336/60 |
| 6,938,417 B2 | 9/2005 | Watanabe et al. | ............. | 60/597 |
| 6,941,759 B2 * | 9/2005 | Bellac et al. | ............. | 60/772 |
| 7,007,484 B2 * | 3/2006 | Stegmaier et al. | ............. | 60/772 |
| 7,644,573 B2 * | 1/2010 | Smith et al. | ............. | 60/39.182 |
| 2004/0144113 A1 * | 7/2004 | Longardner | ............. | 62/238.3 |
| 2005/0056023 A1 * | 3/2005 | Pierson | ............. | 60/772 |
| 2005/0103032 A1 * | 5/2005 | Pierson | ............. | 62/175 |
| 2005/0188707 A1 | 9/2005 | Kodama et al. | ............. | 62/148 |

FOREIGN PATENT DOCUMENTS

EP    1484489 A2    5/2004

* cited by examiner

*Primary Examiner*—William H Rodriguez
(74) *Attorney, Agent, or Firm*—Edward J. Smith; Ernest G. Cusick; Frank A. Landgraff

(57) ABSTRACT

An integrated power plant cooling system for an electrical generating power plant driven by a gas turbine to cool power plant components is provided. The integrated cooling system includes a heat source extracted from the power plant and an absorption chiller utilizing energy from the heat source to cool a chilling medium. An integrated cooling skid includes heat removal devices for a plurality of power plant components. The chilling medium output from the absorption chiller is circulated to the heat removal devices for the power plant components of the integrated cooling skid. Plant cooling water may remove heat from the absorption chiller.

20 Claims, 8 Drawing Sheets

INTEGRATED PLANT COOLING SYSTEM

BACKGROUND OF THE INVENTION

This invention relates to a power plant cooling system for power plant equipment and more specifically to an integrated power plant cooling system utilizing multiple methods for generating a cooling medium to remove heat from an integrated skid of power plant cooling components. Typical cooling requirements of a power plant include generator cooling; lube oil cooling; transformer cooling; turbine inlet cooling; turbine inlet air cooling and intercooler cooling; and cooling for other miscellaneous components.

Many power plant components such as generators, lube oil systems, and transformers, require cooling to reject the heat generated by inefficiencies (windage, bearings, electrical heating, etc.), while additional cooling functions directly impact plant performance, as for example turbine inlet air cooling, compressor inlet air cooling or compressor intercooling. Individual cooling devices for these components typically utilize air or water-cooled heat exchangers. Generator cooling in existing configurations is provided by water or air supplied at ambient temperature. Lube oil systems usually utilize large air-cooled heat exchangers. Compressor intercoolers utilize water at ambient temperature. Transformer oils are cooled by rejecting heat to atmosphere using air-cooled heat exchangers.

Independent cooling skids are often utilized to provide the above cooling. Even when equipment is supplied with coolant from a common cooling system the equipment and coolers are sized for the highest ambient condition. This high temperature cooling fluid (air and water at ambient) causes the heat exchangers to have higher area and penalizes the over all power plant efficiency and cost.

Several means are commonly employed to provide cooling to power plant components. These methods are independent cooling skids with individual control systems. FIG. 1 illustrates independent cooling skids used to provide cooling in prior art power plant cooling systems. A power plant system 5 may include an air compressor 10, a gas turbine 15, a generator 20, and a transformer 25, which couples the generator 20 to supply electric power to the electrical grid system 30. Fuel is supplied to the gas turbine at 16 and compressed air at 17. Exhaust gas exits the gas turbine at 18.

Ambient air 35 is cooled through turbine inlet cooling skid 40 and provided at air compressor inlet 45. Hot compressed air 50 is extracted from an interstage 52 of the air compressor 10 and passed through compressor intercooling skid 55. Cooled air 56 is returned to a succeeding interstage 58 of the air compressor 10. Lube oil from the compressor 10, the gas turbine 15 and the generator 20 are cooled by lube oil cooling skid 60. Heat is removed from the lube oil on cooling skid 60 by an air-cooled heat exchanger using air at ambient temperature 65. Generator cooling water 22 circulates through a separate cooling skid 23 utilizing an air cooled heat exchanger drawing ambient air 24. Cooling for the transformer 25 is typically provided by transformer oil 26 passing through an air-cooled heat exchanger employing ambient air 27, the heat exchanger mounted on a separate transformer cooling skid 28. Turbine inlet cooling may be provided using chilled water provided by an independent mechanical compressor (not shown). In some cases, skids may be partially integrated systems with common water (not chilled).

As is always true in power plant determinations, the cooling requirements on each of the component systems is a function of site specific ambient and operating conditions, the performance available from each competing system and the costs required to implement and operate.

Accordingly, there is a need to provide an alternative cost effective method of integrating the independent power plant cooling skids into one single cooling system utilizing an absorption or a mechanical chiller providing chilled water for all power plant equipment requiring cooling, where controlled lower temperature cooling fluid (chilled water) will result in significant savings, simplify the plant operation and provide a reliable source of cooling medium.

BRIEF DESCRIPTION OF THE INVENTION

The present invention relates to an integrated power plant cooling system utilizing multiple methods for generating a chilled cooling medium to meet power plant cooling requirements, where plant components are integrated into an effective and efficient cooling package.

Briefly, one aspect of the present invention provides an integrated power plant cooling system for an electrical generating power plant driven by a gas turbine to cool power plant components. The integrated cooling system includes a heat source extracted from the power plant and an absorption chiller utilizing energy from the heat source to cool a chilling medium. Further provided are means for removing heat from the absorption chiller. An integrated cooling skid includes heat removal devices for a plurality of power plant components. Means are provided for circulating the chilling medium output from the absorption chiller to the heat removal devices for the power plant components of the integrated cooling skid and back again.

In accordance with another aspect of the present invention an integrated power plant cooling system for an electrical generating power plant driven by a gas turbine to cool power plant components is provided. The integrated plant cooling system includes a exhaust gas path from the gas turbine providing an energy source and an absorption chiller utilizing the energy from the turbine exhaust to cool a chilling medium. Means are provided for removing heat from the absorption chiller and for removing exhaust gas from the absorption chiller. An integrated cooling skid includes heat removal devices for a plurality of power plant components.

In accordance with a further aspect of the present invention, an integrated power plant cooling system for an electrical generating power plant driven by a gas turbine to cool power plant components is provided. The integrated plant cooling system includes a gas turbine with an air compressor; an electrical generator being driven by the gas turbine and outputting an electric power supply; the electric power supply feeding a mechanical chiller; means for removing heat from the mechanical chiller; means for circulating the chilling medium output from the mechanical chiller to the power plant components of the integrated cooling skid and back again; and an integrated cooling skid including heat removal devices for a plurality of power plant components

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including providing a cost effective method of integrating the independent power plant cooling skids into one single cooling system utilizing an absorption or a mechanical chiller providing a cooling medium for all power plant equipment requiring cooling, where the controlled lower temperature cooling medium will result in significant savings, simplify the plant operation and provide a reliable source of cooling medium.

The following aspects are intended for both retrofitting existing power plants and to construction of new power plants.

The following exemplary system configurations for simple and combined cycle applications employ a commercially available absorption liquid chiller (ALC) for providing chilled fluid to the integrated plant cooling setup. This could be achieved in multiple configuration and ways as described in FIGS. 2-7. Alternatively, a mechanical chiller may be utilized to cool the integrated plant cooling system, as illustrated in FIG. 8.

A gas turbine compressor has multiple stage of compression as represented by letters A to J in FIGS. 1-7. Hot air from the compressor can in principle be drawn from any of the intermediate stages by redesigning the compressor. The amount of airflow drawn from the compressor and the selection of the air withdrawal stage will be a function of the cooling requirements of the power plant equipment, cycle thermodynamics, and equipment economics. While for the exemplary purposes of FIGS. 2-7, the air withdrawal is shown as being extracted from interstage D and returned to interstage E, the extraction and retrieval is not limited to these stages.

The exemplary embodiments that follow identify an integrated cooling skid for cooling a variety of power plant components by circulating gases and fluids between chillers and heat removal devices, usually heat exchangers on the skid. Although, these may include a variety of heat exchangers, pumps, valves, piping and electrical controls, the details for the heat exchangers, piping and ducting are known in the art and are not described in greater detail to avoid obscuring the invention.

Further, while the following exemplary embodiments describe configurations related to GE gas turbines, the invention may be generally applied to the components and systems of gas turbines.

Figure 1:
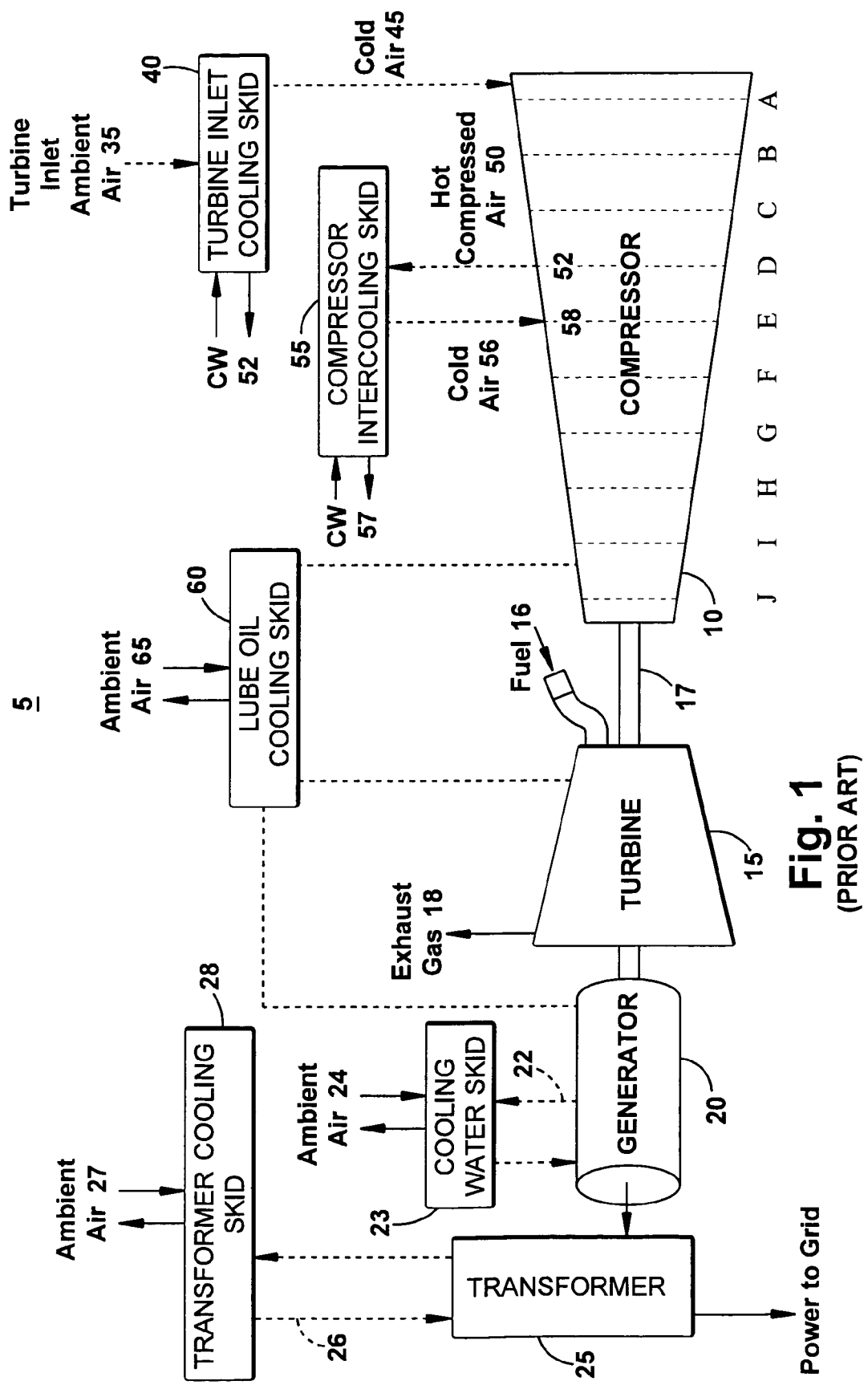
FIG. 1 illustrates independent cooling skids used to provide cooling in prior art power plant cooling systems.
Figure 2:
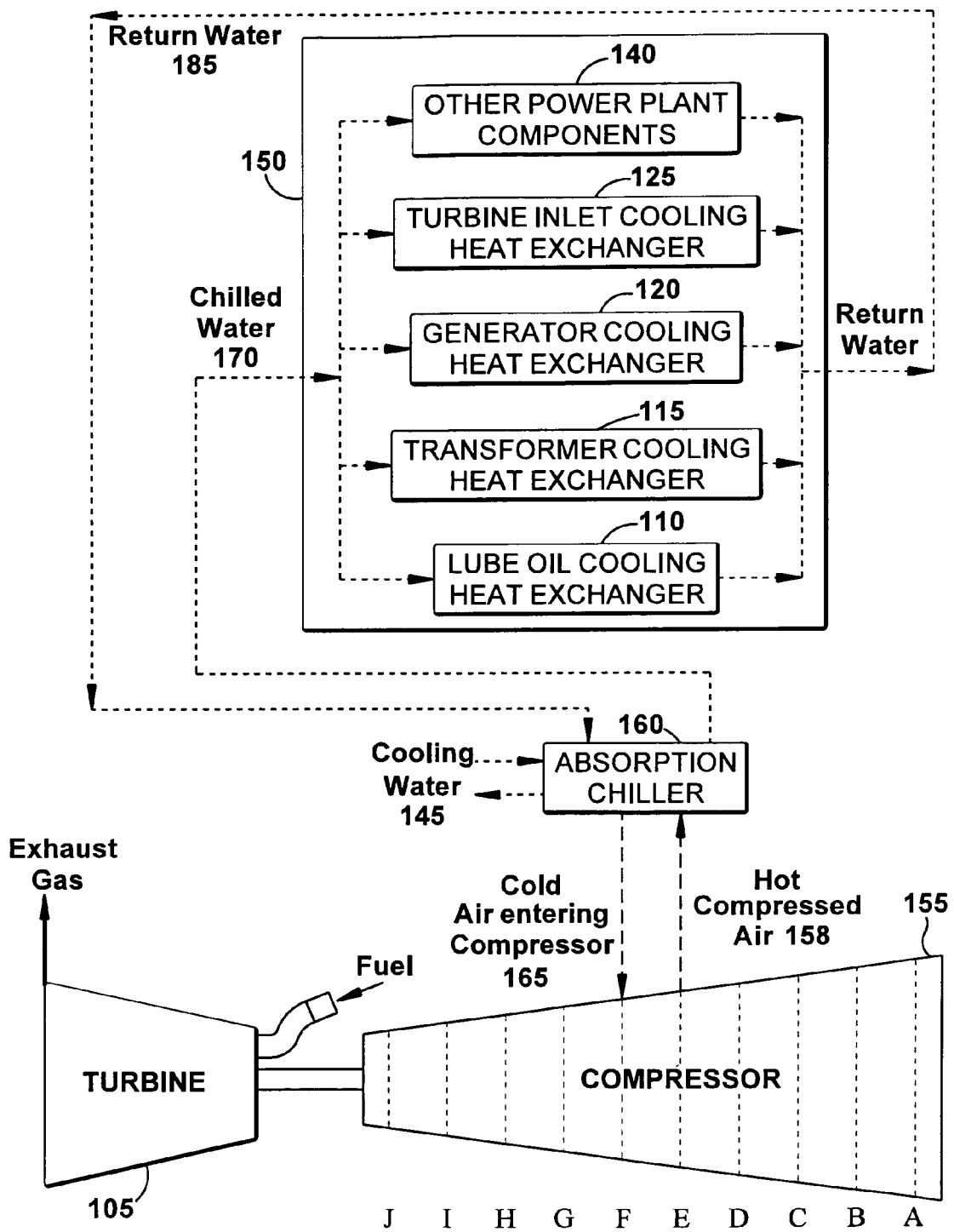
FIG. 2 illustrates one embodiment of the present invention providing an absorption chiller powered by hot interstage air from the air compressor and supplying an integrated cooling skid for power plant components.

FIG. 2 illustrates one embodiment of the present invention providing an absorption chiller powered by hot interstage air from the air compressor and supplying an integrated cooling skid for power plant components. The integrated cooling skid may combine lube oil cooling heat exchanger 110, transformer cooling heat exchanger 115, generator cooling heat exchanger 120, turbine inlet cooling heat exchanger 125 and other heat exchangers for miscellaneous power plant components requiring cooling $_{[RWS1]}$140 into one system held on skid 150. An absorption chiller 160 provides the chilled water requirement for this integrated system. The heat source for the absorption chiller 160 is hot compressed air 158, which is provided by extraction from interstage D of compressor 155. The relatively cold air 165 from the absorption chiller is ducted back into a subsequent interstage E of compressor 155. Chilled water 170 is circulated to the integrated cooling skid 150 and return water 185 returned to absorption chiller 160 using mechanical systems known in the art. Cooling water 145 from the plant provides a sink for heat from absorption chiller 160.

Figure 3:
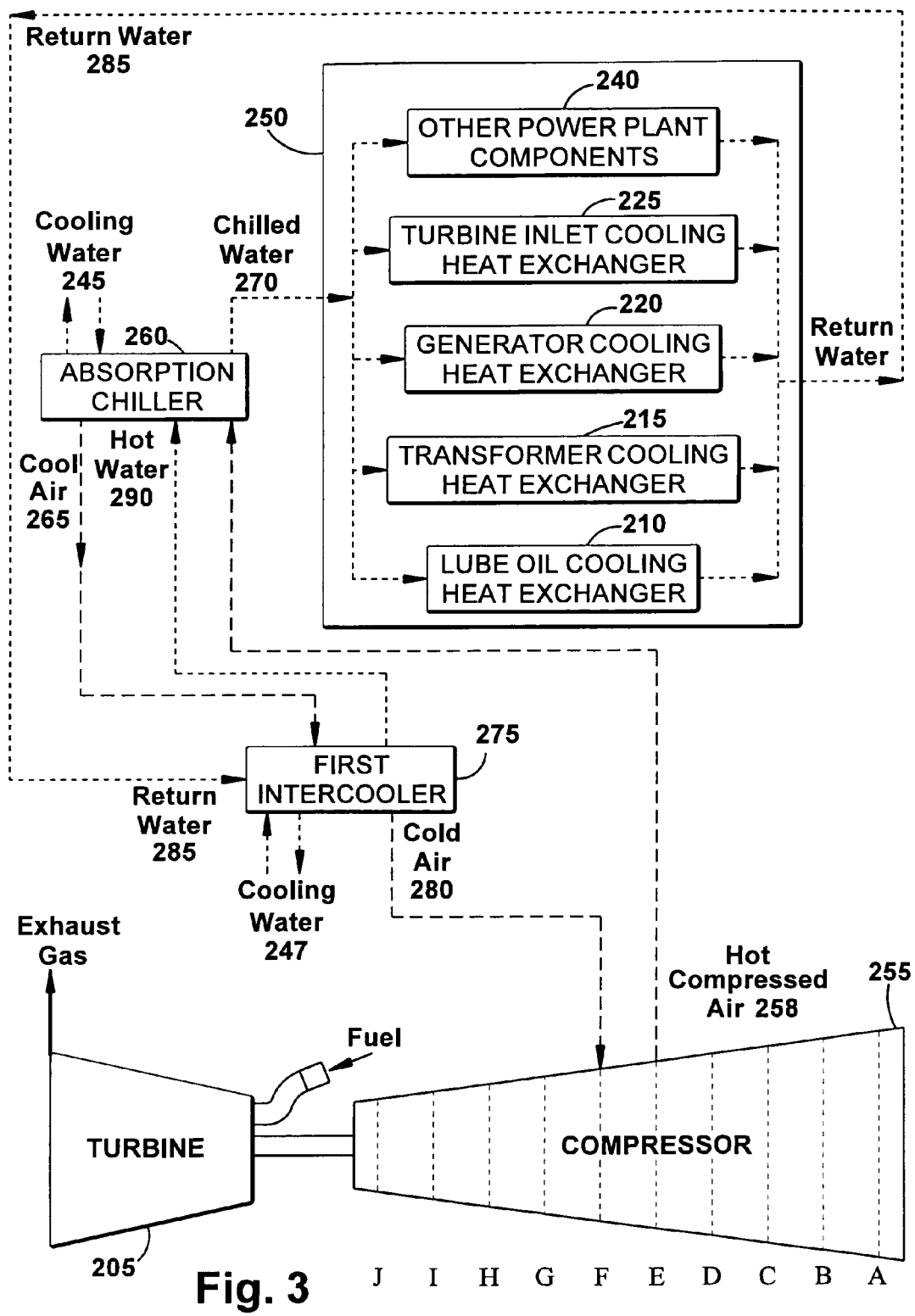
FIG. 3 illustrates a second embodiment of the present invention providing an absorption chiller, powered by hot interstage air from the air compressor, and a first intercooler supplying an integrated cooling skid for power plant components.

FIG. 3 illustrates a second embodiment of the present invention providing an absorption chiller, powered by hot compressed interstage air from the air compressor, and a first intercooler supplying an integrated cooling skid for power plant components. The integrated cooling skid 250 may include a lube oil cooling heat exchanger 210, a transformer cooling heat exchanger 215, a generator cooling heat exchanger, 220, a turbine inlet cooling heat exchanger 225 and other heat exchangers for miscellaneous power plant components requiring cooling 240.

Hot compressed air 258 is extracted from an interstage D of compressor 255 and ducted to absorption chiller 260 to provide a heating fluid for ALC cooling of the cooling medium. The cooling medium, chilled water 270 is circulated to the integrated cooling skid 250. Returning cool air 265 from absorption chiller 260 is ducted through a first intercooler 275 to further lower temperature of cold return air 280 to interstage E of compressor 255, thereby providing reduced compressor power consumption. The cooling medium provided to the first intercooler 270 is the return water 285 from the chilled water 270 to integrated plant cooling skid 250. After absorbing heat in the intercooler, the hot water 290 returns to the absorption chiller 260. Cooling water 245 and cooling water 247 may respectively provide a heat sink for the absorption chiller 265 and first intercooler 275.

A further alternative within Embodiment 2 is that intercooling can be provided by a cooling water supply 247 when the demand on absorption chiller is high due to high cooling requirements from other power plant equipment.

Figure 4:
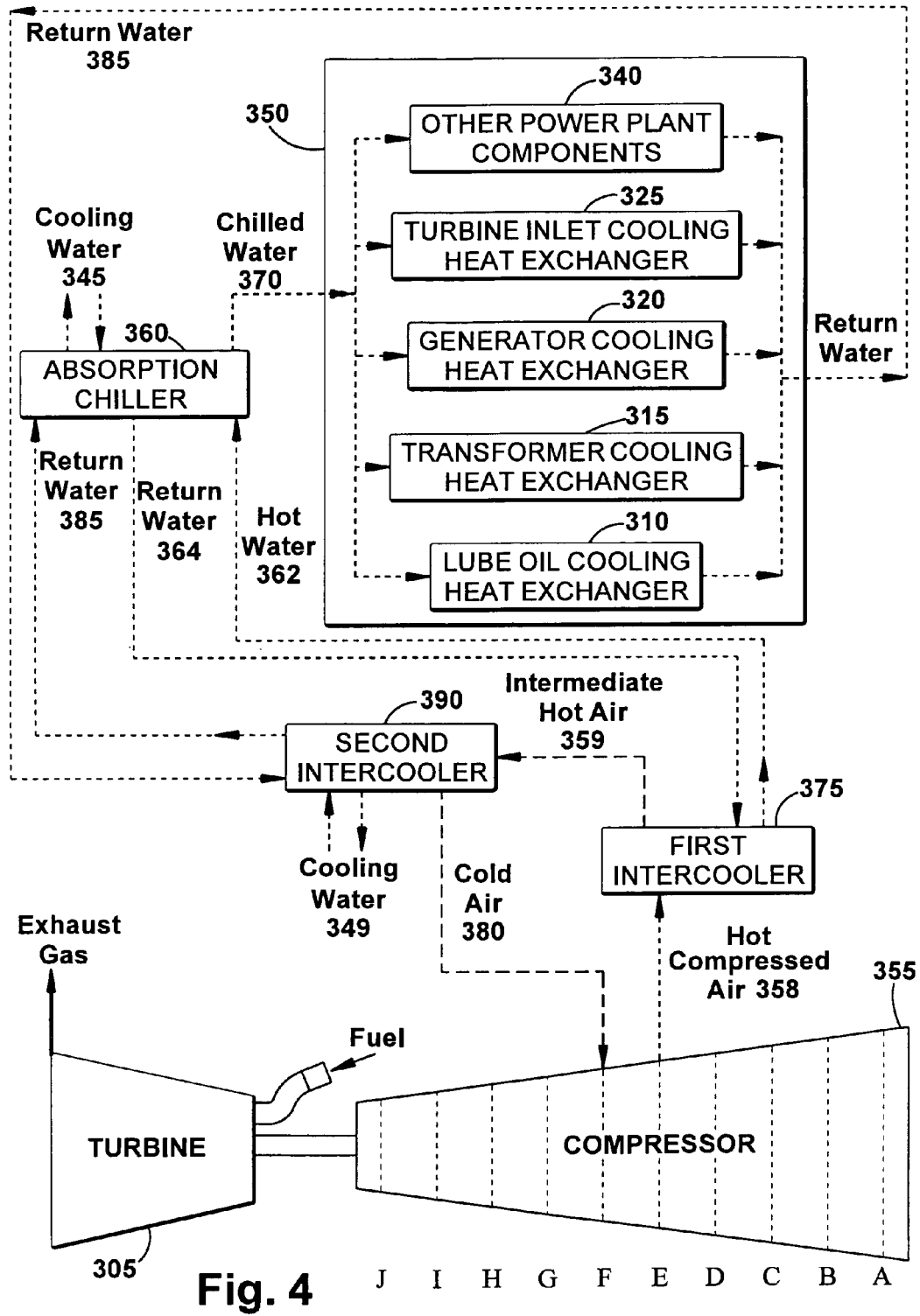
FIG. 4 illustrates a third embodiment of the present invention providing an absorption chiller, powered by hot interstage air from the air compressor, a first intercooler and a second intercooler supplying an integrated cooling skid for power plant components.

FIG. 4 illustrates a third embodiment of the present invention providing an absorption chiller, powered by hot interstage air from the air compressor, a first intercooler and a second intercooler supplying an integrated cooling skid for power plant equipment. The integrated cooling skid 350 may include a lube oil cooling heat exchanger 310, a transformer cooling heat exchanger 315, a generator cooling heat exchanger, 320, a turbine inlet cooling heat exchanger 325 and other heat exchangers for miscellaneous power plant components requiring cooling 340.

Embodiment 3 describes the configuration in which hot compressed air 358 from interstage D of compressor 355 is ducted through a first intercooler 375. The first intercooler 375 is designed to generate hot water 362 at high temperatures for use as a heating fluid for absorption chiller 360. Return water 364 from absorption chiller 360 provides the cooling for the first intercooler 375.

The absorption chiller 360, in turn, provides chilled water 370 to the integrated cooling skid 350 for cooling power plant components. Heat may be removed from absorption chiller 360 by cooling water 345. The intermediate temperature hot air 359 leaving the first intercooler 375 is passed through a second intercooler 390 for further cooling. The second intercooler 390 is cooled by the return water supply 385 from integrated cooling skid 350 on a return circuit to absorption chiller 360. Cold return air 380 is ducted to interstage E of compressor 355 further, thereby reducing compressor power consumption. The second intercooler 390 can alternatively be provided by ambient cooling water 349 when demand on absorption chiller is high.

Figure 5:
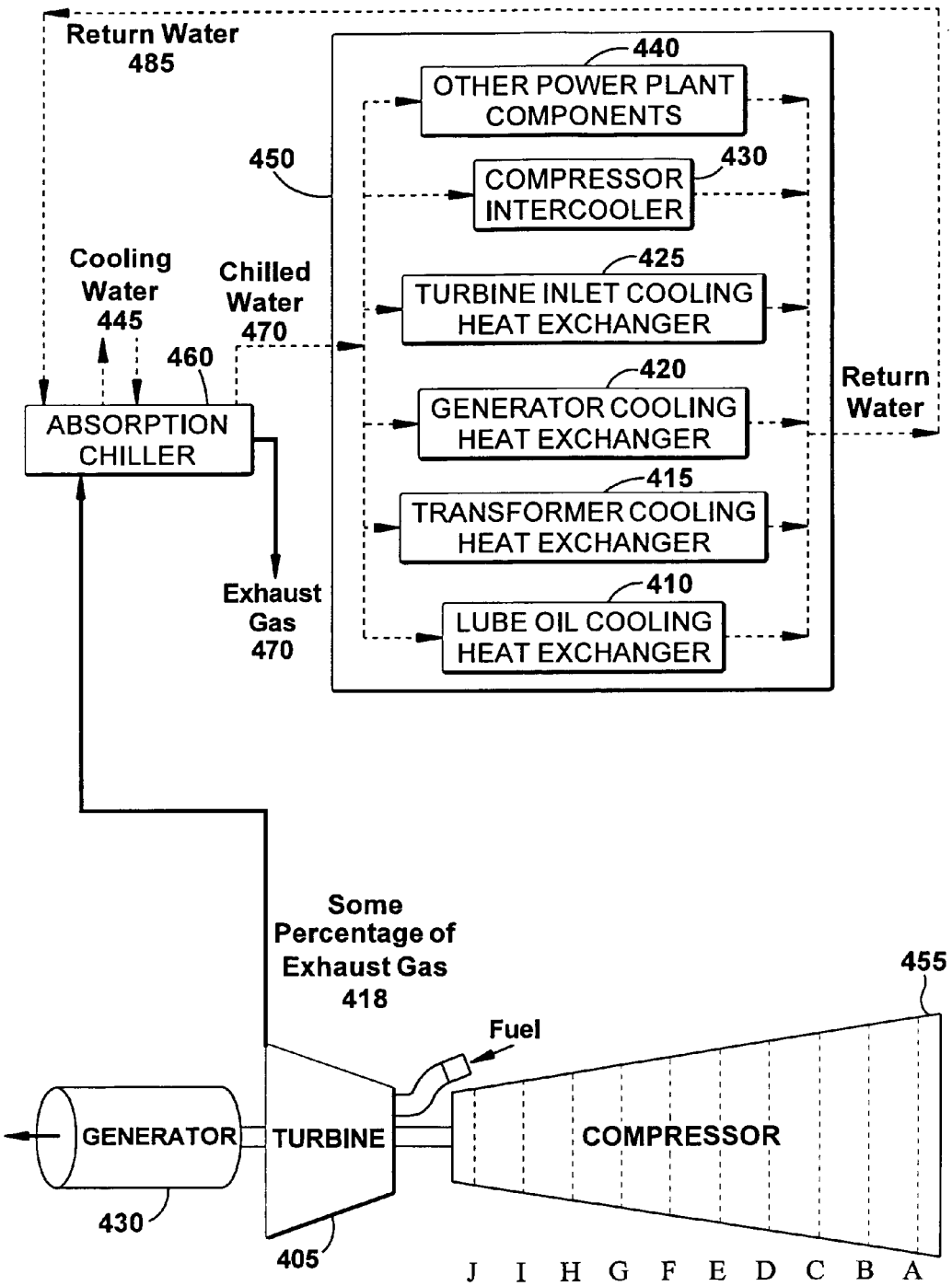
FIG. 5 illustrates a fourth embodiment of the present invention providing an absorption chiller, powered by gas turbine exhaust and supplying an integrated cooling skid for power plant components.

FIG. 5 illustrates a fourth embodiment of the present invention providing an absorption chiller, powered by gas turbine exhaust and supplying an integrated cooling skid for power plant components. Embodiment 4 describes a completely integrated power plant cooling setup, incorporating an integrated cooling skid 450 which may include a lube oil cooling heat exchanger 410, a transformer cooling heat exchanger 415, a generator cooling heat exchanger, 420, a turbine inlet cooling heat exchanger 425, a compressor intercooler 430, and other heat exchangers for miscellaneous power plant components requiring cooling 440.

This configuration can be used in simple cycle and combined cycles where part of the turbine exhaust can be ducted into the absorption chiller. In the exemplary embodiment, absorption chiller 460 utilizes the energy from some percentage of the exhaust gas 418 ducted from the gas turbine 405. The absorption chiller subsequently removes heat from a cooling medium, shown in this embodiment as return water 485 to provide chilled water 470 to meet cooling requirements for the integrated cooling skid 450. Cooling water 445 may remove heat from absorption chiller 460.

Though not shown, compressor intercooler 440 may receive hot compressed air ducted from interstage D of compressor 455. The hot compressed air. having been cooled in compressor intercooler 440 is returned to a succeeding stage E of the compressor 440, thereby providing lower compressor power consumption. The exhaust gas 418, taken from the turbine 405 and having utilized its energy in powering absorption chiller 460, is released as exhaust gas 470.

Figure 6:
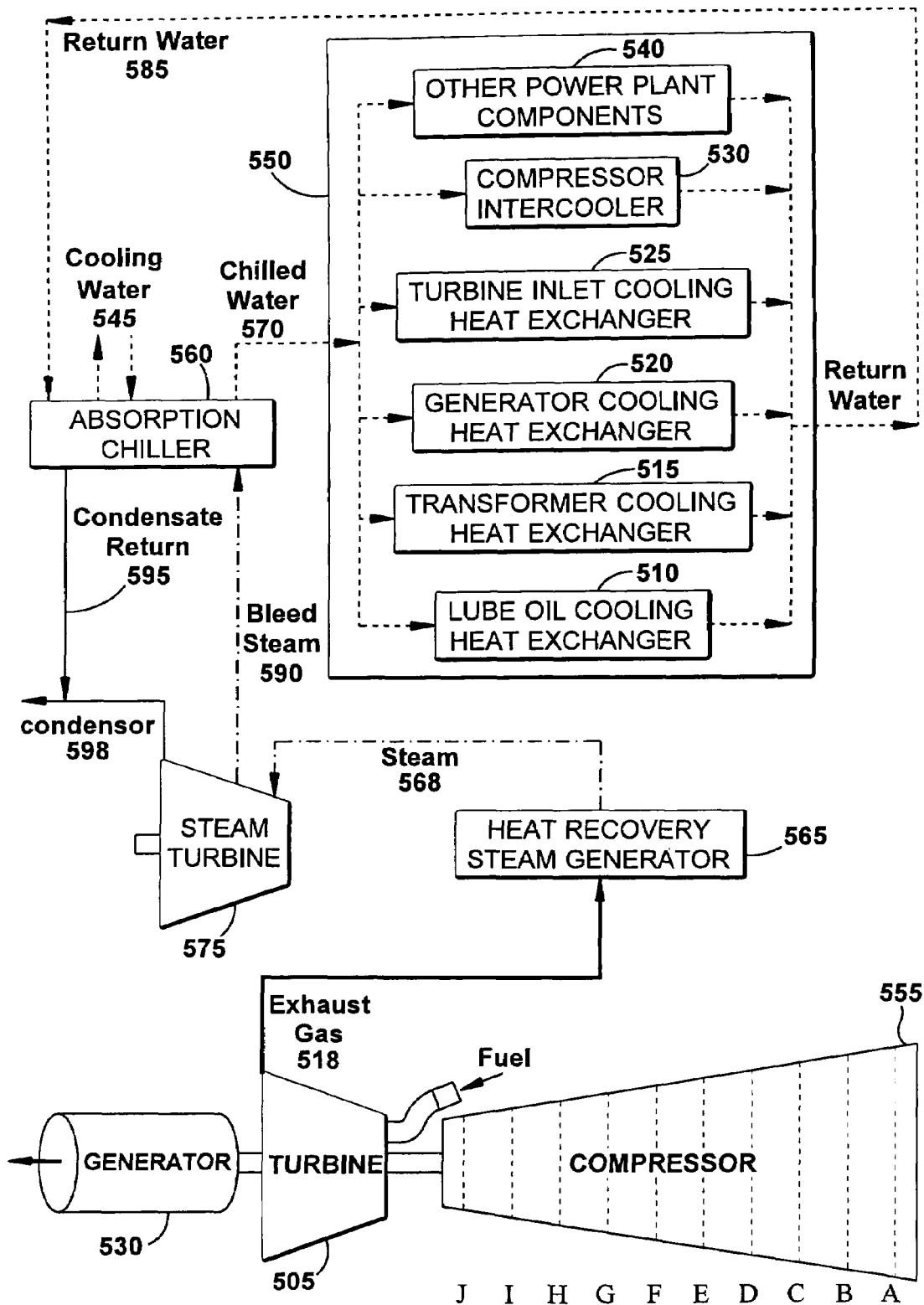
FIG. 6 illustrates a fifth embodiment of the present invention providing an absorption chiller, powered by energy of gas turbine exhaust captured through a heat recovery steam generator and bled from a steam turbine and supplying an integrated cooling skid for power plant components.

FIG. 6 illustrates a fifth embodiment of the present invention providing an absorption chiller, powered by energy of gas turbine exhaust captured through a heat recovery steam generator (HRSG) and bled from a steam turbine and supplying an integrated cooling skid for power plant components. Embodiment 5 describes the modification to embodiment 4. Again the integrated cooling skid 550 may service a lube oil cooling heat exchanger 510, a transformer cooling heat exchanger 515, a generator cooling heat exchanger, 520, a turbine inlet cooling heat exchanger 525, a compressor intercooler 530, and other heat exchangers for miscellaneous power plant components requiring cooling 540 utilizing chilled water 570 provided by absorption chiller 560. Return water 585 from the integrated cooling skid 550 is returned to the absorption chiller 560. Heat may be removed from absorption chiller by cooling water 545.

Energy for the absorption chiller 560 is provided by exhaust gas 518 from turbine 505 to a heat recovery steam generator 565 delivering steam 568 to steam turbine 575 as part of a combined cycle power plant. Low-grade bleed steam 590 is extracted from a steam turbine 575 to power the absorption chiller 560. Steam exhaust 598 from steam turbine 575 and condensate 595 from absorption chiller 560 are returned to the steam cycle.

Figure 7:
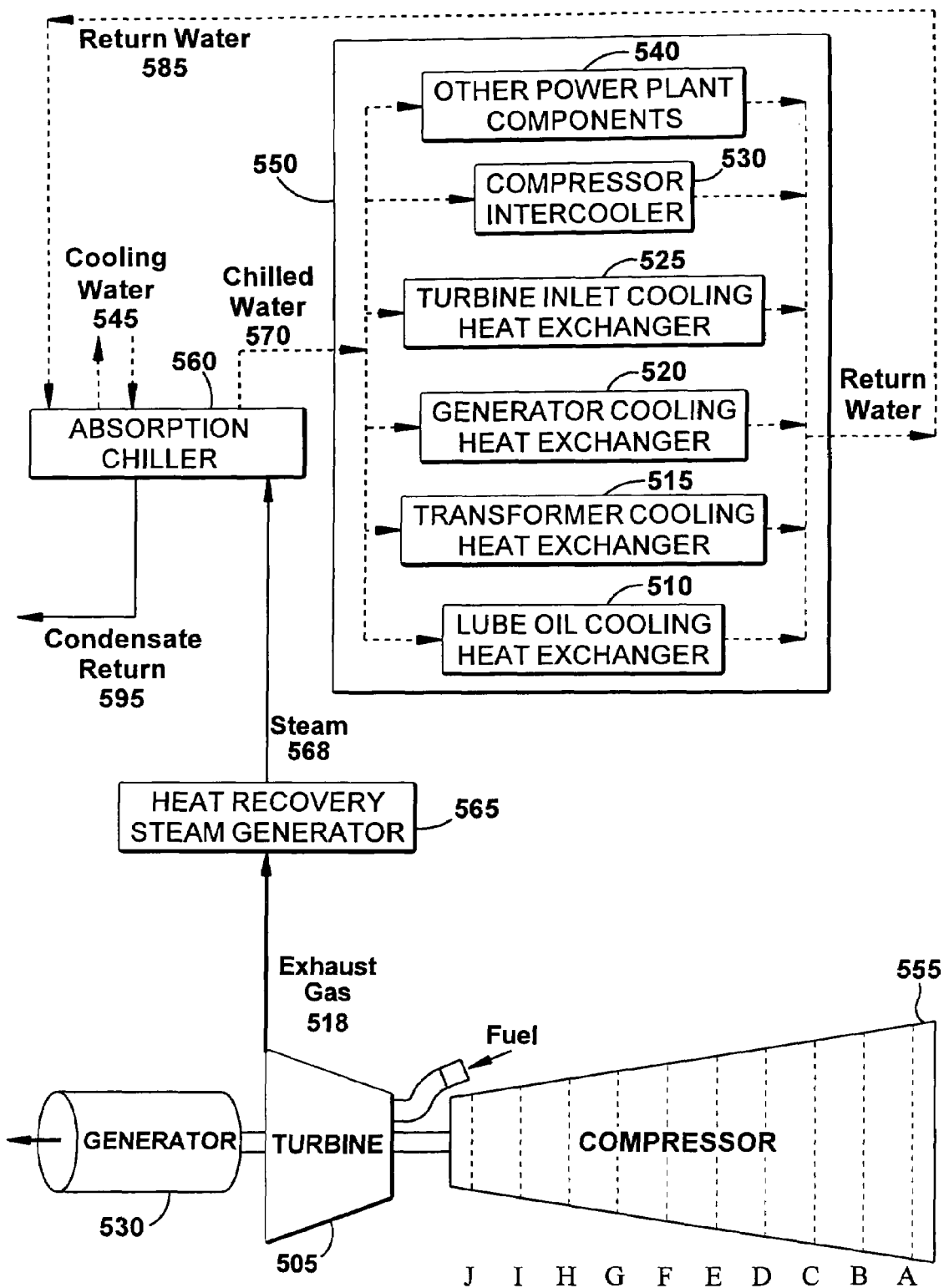
FIG. 7 illustrates a sixth embodiment of the present invention providing an absorption chiller, powered by energy of gas turbine exhaust as captured through a heat recovery steam generator (HRSG) and supplying an integrated cooling skid for power plant components.
Figure 8:
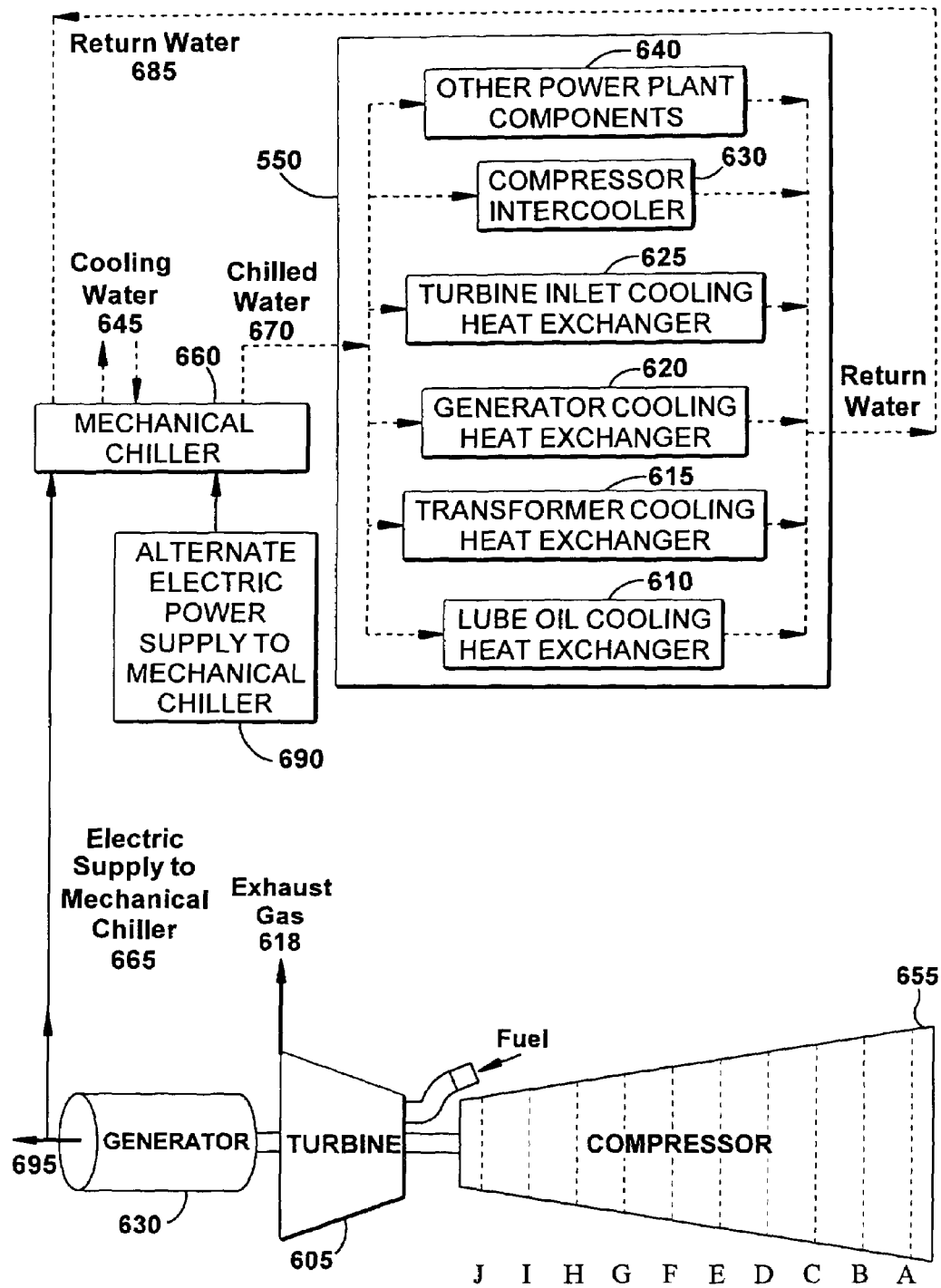
FIG. 8 illustrates a seventh embodiment of the present invention providing an mechanical chiller, powered by electrical output from a gas turbine driven generator or other electrical supply and supplying an integrated cooling skid for power plant components.

FIG. 7 illustrates a sixth embodiment of the present invention providing an absorption chiller, powered by energy of gas turbine exhaust 518 as captured through a heat recovery steam generator (HRSG) 565 and supplying an integrated cooling skid 550 for power plant equipment. Steam 568 from the HRSG 565 provides energy to the absorption chiller and may also be used for other plant functions. Again the integrated cooling skid 550 services a lube oil cooling heat exchanger 510, a transformer cooling heat exchanger 515, a generator cooling heat exchanger, 520, a turbine inlet cooling heat exchanger 525, a compressor intercooler 530, and other heat exchangers for miscellaneous power plant components requiring cooling 540. The integrated cooling skid 550 utilizes chilled water 570 provided by absorption chiller 560 to cool the heat removal devices. Return water 585 is circulated back to the absorption chiller 560. Cooling water 545 may remove heat from the absorption chiller 560.

Energy is provided by exhaust gas 565 from turbine 505 to a heat recovery steam generator 565 delivering steam 568 to power the absorption chiller 560. Steam condensate 595 from absorption chiller 560 is returned to the steam cycle.

FIG. 8 illustrates a seventh embodiment of the present invention, in which a vapor compression mechanical chiller provides the cooling requirements for the integrated plant cooling skid. Integrated cooling skid 650 services a lube oil cooling heat exchanger 610, a transformer cooling heat exchanger 615, a generator cooling heat exchanger 620, a turbine inlet cooling heat exchanger 625, a compressor intercooler 630, and other heat exchangers for miscellaneous power plant components requiring cooling 640.

Turbine 605 drives generator 630 to provide an electrical output 695. The electric output 695 may provide electric power to drive the mechanical chiller 660. Mechanical chiller 660 provides the chilled water 670 to the integrated cooling skid 650. Cooling water 645 removes heat from the mechanical chiller 660. Alternately, the mechanical chiller 660 may be supplied from another source of electric power with the power plant or from an external source.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An integrated power plant cooling system for an electrical generating power plant driven by a gas turbine to cool power plant components, the integrated cooling system comprising:
a heat source extracted from the power plant;
an absorption chiller utilizing energy from the heat source to cool a chilling medium;
means for removing heat from the absorption chiller;
an integrated cooling skid including heat removal devices for a plurality of power plant components; and means for circulating the chilling medium output from the absorption chiller to the heat removal devices for power plant components of the integrated cooling skid.

2. The integrated power plant cooling system for an electrical generating power plant driven by a gas turbine to cool power plant components according to claim 1, the heat source comprising:
    an extraction flow path for hot compressed air from at least one interstage of a gas turbine compressor; and
    a return path for the hot compressed air, which has been cooled, to a succeeding stage of the gas turbine compressor.

3. The integrated power plant cooling system for an electrical generating power plant driven by a gas turbine to cool power plant components according to claim 2, the heat removal devices for the power plant components of the integrated cooling skid comprising at least one of:
    a lube oil cooling heat exchanger;
    a generator cooling heat exchanger;
    a transformer cooling heat exchanger;
    a turbine inlet heat exchanger; and
    heat exchangers for other power plant components.

4. The integrated power plant cooling system for an electrical generating power plant driven by a gas turbine to cool power plant components according to claim 2, the heat removal devices for the power plant components of the integrated cooling skid comprising:
    a lube oil cooling heat exchanger;
    a generator cooling heat exchanger;
    a transformer cooling heat exchanger;
    a turbine inlet heat exchanger; and
    heat exchangers for other power plant components.

5. The integrated power plant cooling system for an electrical generating power plant driven by a gas turbine to cool power plant components according to claim 3, the chilling medium comprising: chilled water.

6. The integrated power plant cooling system for an electrical generating power plant driven by a gas turbine to cool power plant components according to claim 5, the means for removing heat from the absorption chiller comprising: a cooling water source and sink for the absorption chiller.

7. The integrated power plant cooling system for an electrical generating power plant driven by a gas turbine to cool power plant components according to claim 3, the extraction flow path for hot compressed air from at least one interstage of a gas turbine compressor and the return path for the hot compressed air comprising: a communication path directly between the gas turbine compressor and the absorption chiller.

8. The integrated power plant cooling system for an electrical generating power plant driven by a gas turbine to cool power plant components according to claim 3, further comprising a first intercooler.

9. The integrated power plant cooling system for an electrical generating power plant driven by a gas turbine to cool power plant components according to claim 8, wherein:
    the extraction flow path for hot compressed air from at least one interstage of a gas turbine compressor communicates directly with the absorption chiller;
    the return path for the hot compressed air communicates with a succeeding stage of the air compressor through the first intercooler, the hot compressed air being cooled in the absorption chiller and further cooled in the intercooler; and
    the chilling medium, returning from the integrated plant cooling skid to the absorption chiller, circulates through the first intercooler further cooling the hot compressed air returning from the absorption chiller to the succeeding stage of the air compressor.

10. The integrated power plant cooling system for an electrical generating power plant driven by a gas turbine to cool power plant components according to claim 3, further comprising a first intercooler and a second intercooler.

11. The integrated power plant cooling system for an electrical generating power plant driven by a gas turbine to cool power plant components according to claim 10, comprising:
    a circulating path for the hot compressed air from at least one interstage from the compressor through the first intercooler and the second intercooler, returning to the succeeding stage of the air compressor;
    an energy exchange, the hot compressed air supplying heat energy to the first intercooler and the first intercooler and the second intercooling cooling the hot compressed air returning to the succeeding stage of the air compressor;
    a circulating path between the first intercooler and the absorption chiller for hot water, the hot water heated in the first intercooler by the hot compressed air and supplying the energy to the absorption chiller for operation; and
    a cooling water source and sink for the second intercooler.

12. An integrated power plant cooling system for an electrical generating power plant driven by a gas turbine to cool power plant components, the integrated plant cooling system comprising:
    a exhaust gas path from the gas turbine providing an energy source;
    an absorption chiller utilizing the energy from the turbine exhaust to cool a chilling medium;
    means for removing heat from the absorption chiller;
    means for removing exhaust gas from the absorption chiller; and
    an integrated cooling skid including heat removal devices for a plurality of power plant components.

13. The integrated power plant cooling system for an electrical generating power plant driven by a gas turbine to cool power plant components, according to claim 12, the heat removal devices of the integrated cooling skid comprising at least one of:
    a lube oil cooling heat exchanger;
    a generator cooling heat exchanger;
    a transformer cooling heat exchanger;
    a compressor inlet cooling heat exchanger;
    a compressor intercooler; and
    heat exchangers for other power plant components.

14. The integrated power plant cooling system for an electrical generating power plant driven by a gas turbine to cool power plant components, according to claim 12, the heat removal devices of the integrated cooling skid comprising:
    a lube oil cooling heat exchanger;
    a generator cooling heat exchanger;
    a transformer cooling heat exchanger;
    a compressor inlet cooling heat exchanger;
    a compressor intercooler; and
    heat exchangers for other power plant components.

15. The integrated power plant cooling system for an electrical generating power plant driven by a gas turbine to cool power plant components according to claim 13, the plant cooling system further comprising:
    an extraction flow path for hot compressed air from at least one interstage of a gas turbine compressor to the compressor intercooler; and
    a return path for the hot compressed air, which has been cooled in the compressor intercooler, to a succeeding stage of the gas turbine compressor.

16. The integrated power plant cooling system for an electrical generating power plant driven by a gas turbine to cool power plant components, according to claim 13, the plant cooling system further comprising:

the exhaust gas path from the gas turbine communicating directly with the absorption chiller to supply energy to the absorption chiller; and an outlet exhaust path from the absorption chiller for exhaust gas from the gas turbine.

17. The integrated power plant cooling system for an electrical generating power plant driven by a gas turbine to cool power plant components, according to claim 11, the plant cooling system further comprising:

a heat recovery steam generator (HRSG) generating a steam source;

a steam turbine utilizing the generated steam;

a condenser for the steam turbine for condensing exhausted steam from the steam turbine;

the exhaust path for exhaust gas from the gas turbine providing energy to the heat recovery steam generator;

bleed path for bleed steam from the HRSG to the absorption chiller; and a condensate path for condensed bleeder steam from the absorption chiller to the condenser.

18. An integrated power plant cooling system for an electrical generating power plant driven by a gas turbine to cool power plant components, the integrated plant cooling system comprising:

a gas turbine;

an electrical generator, being driven by the gas turbine and outputting an electric power supply;

the electric power supply feeding a mechanical chiller;

means for removing heat from the mechanical chiller; an integrated cooling skid including heat removal devices for a plurality of power plant components and means for circulating the chilling medium output from the mechanical chiller to the power plant components of the integrated cooling skid and back again.

19. The integrated power plant cooling system for an electrical generating power plant driven by a gas turbine to cool power plant components, according to claim 18, the heat removal devices of the integrated cooling skid comprising at least one of the following:

a lube oil cooling heat exchanger;

a generator cooling heat exchanger;

a transformer cooling heat exchanger;

a compressor inlet cooling heat exchanger;

a compressor intercooler; and heat exchangers for other power plant components.

20. The integrated power plant cooling system for an electrical generating power plant driven by a gas turbine to cool power plant components according to claim 18, the plant cooling system further comprising:

an exhaust flow path for hot compressed air from at least one interstage of a gas turbine compressor to the compressor intercooler; and a return path for the hot compressed air, which has been cooled in the compressor intercooler, to a succeeding stage of the gas turbine compressor.

* * * * *